United States Patent
Hawkes et al.

(10) Patent No.: US 10,954,789 B2
(45) Date of Patent: Mar. 23, 2021

(54) ROBOTIC MOBILITY AND CONSTRUCTION BY GROWTH

(71) Applicant: The Board of Trustees of the Leland Stanford Junior University, Palo Alto, CA (US)

(72) Inventors: Elliot W. Hawkes, Santa Barbara, CA (US); Allison M. Okamura, Mountain View, CA (US); Joseph D. Greer, Portland, OR (US); Laura H. Blumenschein, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 15/943,329

(22) Filed: Apr. 2, 2018

(65) Prior Publication Data
US 2019/0217908 A1    Jul. 18, 2019

Related U.S. Application Data

(60) Provisional application No. 62/548,787, filed on Aug. 22, 2017, provisional application No. 62/480,763, filed on Apr. 3, 2017.

(51) Int. Cl.
*F01B 19/04*    (2006.01)

(52) U.S. Cl.
CPC .................... *F01B 19/04* (2013.01)

(58) Field of Classification Search
CPC ........................ F01B 19/04; A61M 25/0119
See application file for complete search history.

(56) References Cited

U.S. PATENT DOCUMENTS

| | | | | |
|---|---|---|---|---|
| 4,778,553 A | * | 10/1988 | Wood | F16L 55/1651 138/141 |
| 2003/0168068 A1 | * | 9/2003 | Poole | A61B 1/00156 128/850 |

* cited by examiner

*Primary Examiner* — F Daniel Lopez
(74) *Attorney, Agent, or Firm* — Lumen Patent Firm (57) ABSTRACT

A robot for navigating an environment through growth is provided. The growing robot has a thin-walled, hollow, pressurized, compliant body that elongates the body by everting from its tip new wall material that is stored inside the body. The robot controls the shape of the body by actively controlling the relative lengths of the wall material along opposing sides of the body allowing steering.

5 Claims, 8 Drawing Sheets

ROBOTIC MOBILITY AND CONSTRUCTION BY GROWTH

CROSS-REFERENCE TO RELATED APPLICATIONS

This application claims priority from U.S. Provisional Patent Application 62/480,763 filed Apr. 3, 2017, which is incorporated herein by reference. This application claims priority from U.S. Provisional Patent Application 62/548,787 filed Aug. 22, 2017, which is incorporated herein by reference.

FIELD OF THE INVENTION

The invention relates to robots and mobility. In particular, the invention relates to mobility devices through growing.

BACKGROUND OF THE INVENTION

Robots have locomotion modes that cover a wide range of movements found in the animal kingdom including rolling, slithering, swimming, walking, running, and flying. Growth, primarily found in the plant kingdom, is a comparatively under-explored paradigm for navigation of a robot, with only a few previous examples of devices that lengthen from their tips. These devices realize growth by eversion or extrusion of new material at the devices' tips.

Growth is an intriguing paradigm for movement because unlike traditional animal locomotion, the entire mass of the growing body does not move with respect to its environment. This results in several advantages. First, there is no sliding friction between the growing body and its surroundings. Second, the body's power source can be stationary. Finally, a growing body does not need to apply forces to its immediate environment to move but can exploit contacts more proximal on the body. These characteristics mean a growing robot is less sensitive to the mechanical properties of its surroundings and make growth an appealing strategy for navigating a constrained, cluttered, or inhomogeneous environment. The present invention advances the art of robotics by providing mobility through growth.

SUMMARY OF THE INVENTION

The present invention provides a robot for navigating an environment through growth. The growing robot has a thin-walled, hollow, pressurized, compliant body that elongates the body by everting from its tip new wall material that is stored inside the body and controls the shape of the body by actively controlling the relative lengths of the wall material along opposing sides of the body.

In one example, the relative lengths of the wall material along opposing sides of the body are controlled by shortening the length of the wall material on the side facing the inside of a turn by using contracting artificial muscles mounted along the length of the body.

In another example, the relative lengths of the wall material along opposing sides of the body are controlled by lengthening the wall material on the side facing the outside of a turn by various actively controlled methods, such as actively releasing pinches in the wall material or actively softening the material so that the body lengthens due to the internal pressure.

In still another example, the relative lengths of the wall material along opposing sides of the body are controlled by actively restraining the length of the wall material on the side facing the inside of a turn while allowing the wall material on the outside of the turn to lengthen.

BRIEF DESCRIPTION OF THE DRAWINGS

FIGS. 1A-C shows according to an exemplary embodiment of the invention a diagram of tip eversion-based growth. (FIG. 1C) Pressurizing the lower sPAM causes it to bulge and contract, resulting in constant curvature bending of the robot body downward.

FIGS. 5A-D show according to an exemplary embodiment of the invention the principle of asymmetric lengthening of tip enables active steering. (FIG. 5A) Implementation in a soft robot uses small pneumatic control chambers and a camera mounted on the tip for visual feedback of the environment. The camera is held in place by a cable running through the body of the robot. (FIG. 5B) To queue an upward turn, the lower control chamber is inflated. (FIG. 5C) As the body grows in length, material on the inflated side lengthens as it everts, resulting in an upward turn (See also FIG. 6). (FIG. 5D) Once the chamber is deflated, the body again lengthens along a straight path, and the curved section remains.

FIG. 6 shows according to an exemplary embodiment of the invention details of an implementation of a mechanism within the control chambers for selective lengthening of the sides of the soft robot. A series of latches are manufactured into the control chambers shown in FIGS. 5A-D. Each latch crosses pinched material, such that when released, the side lengthens. There are four total states. State 1: When the control chamber is depressurized and the latch is on the side, the latch remains closed. State 2: When the control chamber is depressurized and the latch is at the tip, the latch remains closed. (When a control chamber is depressurized, the pressure from the main chamber keeps the latch closed regardless of whether the latch is on the side or at the tip.) State 3: When the control chamber is pressurized and the latch is on the side, the latch remains closed. State 4: When the control chamber is pressurized and the latch is at the tip, the latch opens. (When the control chamber is pressurized, the latch remains closed if it is along a side, due to the shape of the interlocking of the latch, but the latch opens if it is at the tip because the high curvature overcomes the interlocking.)

FIGS. 8A-D shows according to an exemplary embodiment of the invention an overview of turning using an extensible membrane for the body that can stretch axially. A small, inextensible robot body (similar to the main body) can be grown through either of the two side chambers. FIG. 8A) The device grows straight initially. FIG. 8B) When a small robot body is grown into the upper side chamber, that side can no longer stretch. FIG. 8C) If pressure is increased, the body will turn toward the side with the small robot. FIG. 8D) Once a small robot is grown into the lower side as well, the shape is locked, and further growth will continue straight in the new direction.

DETAILED DESCRIPTION

Example 1

In a first example, we teach a new soft pneumatic continuum robot that grows in length. The soft robot extends by growing from its tip and controls its direction of growth by actively shortening the side of its body along the inside of the turn, which allows it to navigate to a designated goal position. Growth of the robot is achieved by everting thin-walled low density polyethylene material at its tip.

Figure 1A:
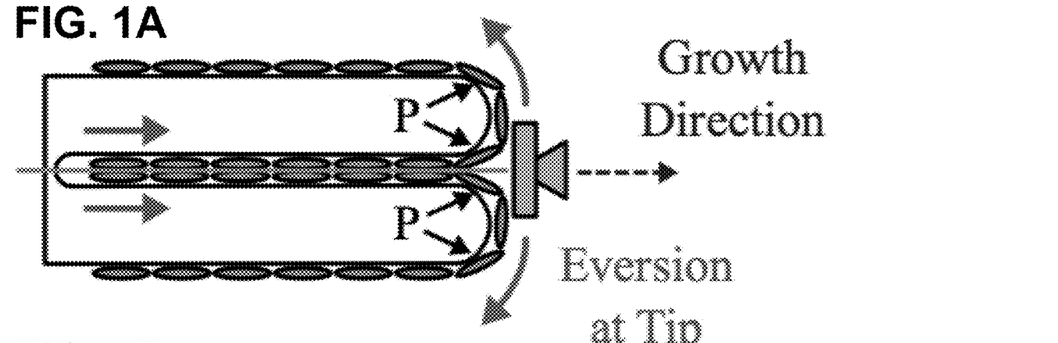
(FIG. 1A) Growing robot in initial configuration. Internal pressure, P, causes robot body and sPAMs, which are attached to the body along its length, to evert at the tip of the robot. Growth direction is indicated by dashed arrow and is always approximately aligned with tip camera's optical axis.
Figure 1B:
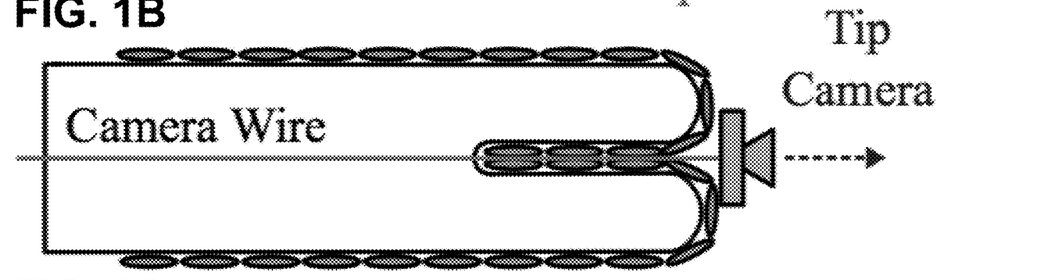
(FIG. 1B) After a period of time, robot has lengthened as a result of growth process. Tension on the camera wire keeps camera stuck at the distal end of the robot.
Figure 1C:
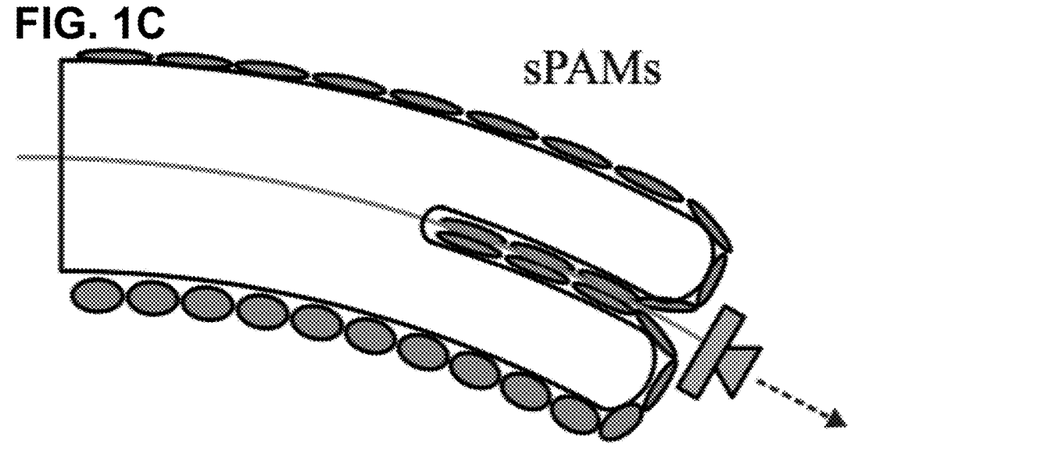

The soft robot is steered from a straight-line growth trajectory by reversible bending of its body. Bending is achieved using series pneumatic artificial muscles (sPAMs). The sPAMs cause reversible bending by exerting a tension force along the length of the robot's body and play a similar role to actuated tendons in traditional continuum robots. A sPAM is a type of pneumatic artificial muscle (PAM), which is a class of contractile actuators that turn the potential energy of compressed gas into mechanical work. Other examples of PAMs include McKibben Muscles, pouch motors, pleated PAMs, and inverse PAMs. Importantly for the application of growth, the sPAMs are soft and can withstand large deformations. This allows them to be everted from the tip of the robot along with the main robot body (FIGS. 1A-C).

Due to their continuously deformable shapes, continuum and soft robots are difficult to model and control precisely compared to their rigid counterparts. In particular, environmental contacts and disturbances may drastically alter the kinematics and dynamics of the robot due to the compliance of their bodies. Because the robot is grown, rather than inserted, its growth direction is always aligned with the robot's body, independent of any environmental contacts or disturbances proximal to the tip (FIGS. 1A-C). This means that if the growing robot's heading is continually aligned with a destination, the robot will eventually reach it. In other words, steering and growth are decoupled.

To address heading control, we present an eye-in-hand visual servo-based heading controller. A camera at the robot's tip (FIGS. 1A-C) whose optical axis is aligned with the axis of the robot's backbone provides a point-of-view image from the robot's perspective. Using this image, an operator may designate an object of interest at which to point the robot. Growth of the robot will result in the robot moving toward the designated object of interest. The reversibility of the bending actuators provides three advantages over the irreversible turning system. First, the robot can reach multiple targets in one growth cycle. Second, mistakes in steering can be corrected. Finally, the operator can reorient the robot to look at different features in its environment without having to grow to reorient the tip of the robot.

Robot Body

Figure 2A:
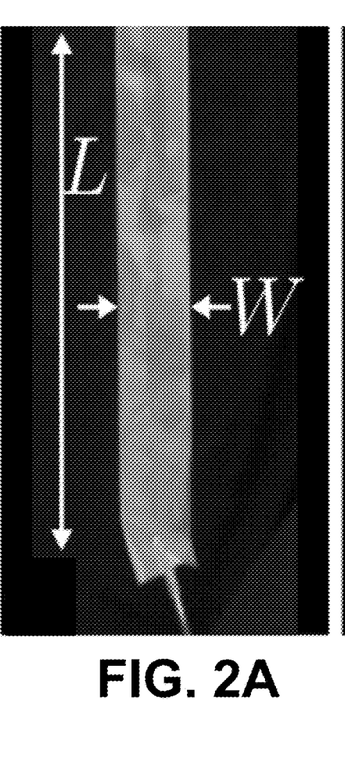
FIGS. 2A-D shows according to an exemplary embodiment of the invention thin-walled polyethylene tubing (FIG. 2A) deflated, (FIG. 2B) inflated, An sPAM is a length of polyethylene tubing with o-rings spaced at regular intervals (FIG. 2C) deflated and (FIG. 2D) inflated.
Figure 2B:
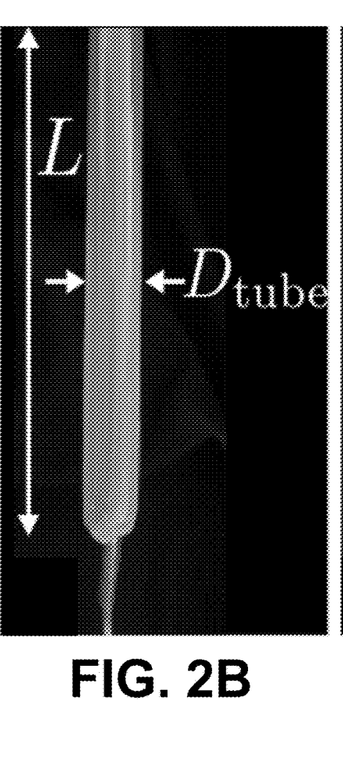
Figure 2C:
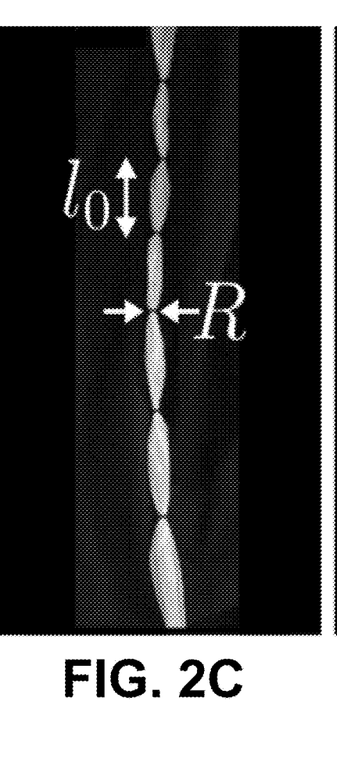
Figure 2D:
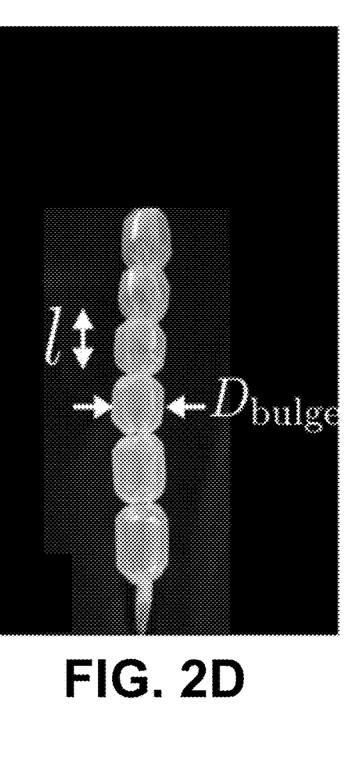

The growing robot is composed of a backbone and three sPAMs arranged radially around the backbone. Both the backbone and the sPAMs start as flat sheets of thin-walled polyethlyene tubing of length L (FIG. 2A). When inflated, the thin-walled polyethylene tubing takes on the shape of a cylinder (FIG. 2B). Rubber o-rings spaced at regular intervals along the length of the sPAM cause the profile of each actuator segment to become bulged when compared to its deflated state (FIG. 2C). Assuming the material does not stretch a significant amount, the actuator will contract when inflated (i.e. its length will be reduced), due to its bulged profile (FIG. 2D). Each of the three sPAMs is attached along the length of the backbone tube with double-sided tape.

The backbone may be thought of as a cantilevered beam whose stiffness is derived from its internal pressure. Similar to the motor-actuated tendons in certain continuum manipulators, the sPAMs exert moments on the pneumatic backbone to cause reversible bending of the robot. The three sPAMs provide controllability of the robot's yaw and pitch.

Finally, the backbone and sPAMs can be inverted so that the robot is an "ungrown" state in which its backbone length is a fraction of its original grown length. When the main tube is pressurized, the robot will evert from the tip and grow back to its original length as shown in FIGS. 1A-C. During the growth process, a camera is kept at the tip of the robot by applying a constant tension force on the camera wires. This force can be supplied by hand or through other means such as a weight or friction clamp. The backward tension on the camera also serves to throttle the rate of growth of the robot.

Pneumatic System

Figure 3:
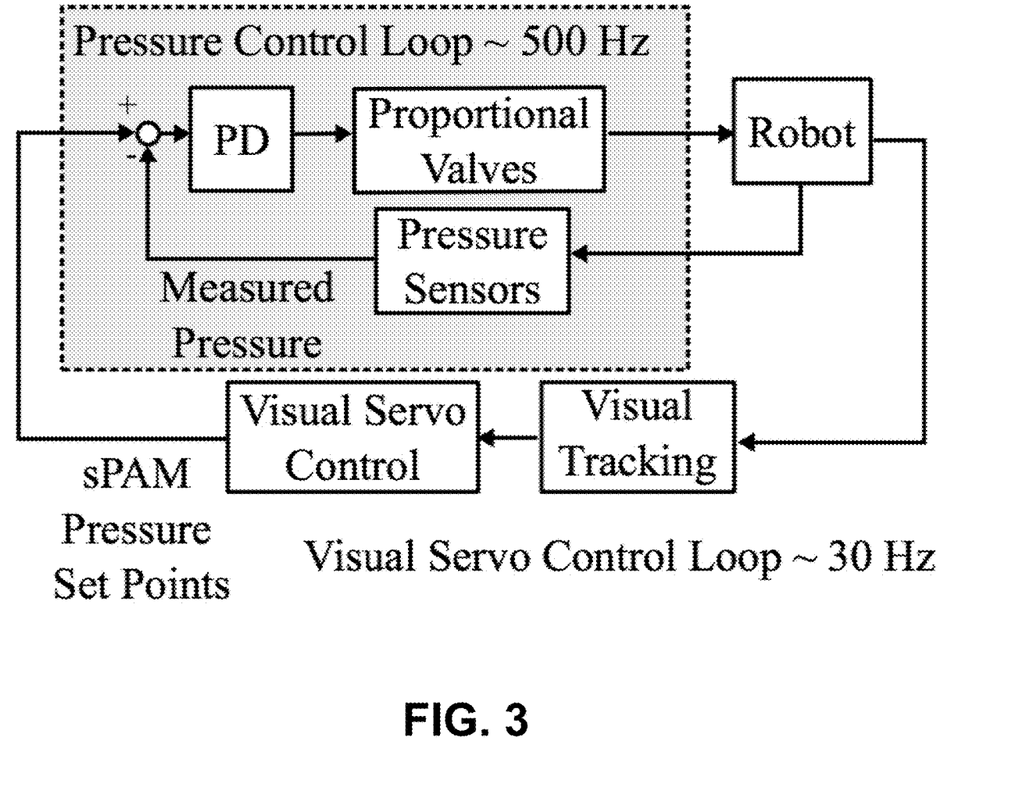
FIG. 3 shows according to an exemplary embodiment of the invention an overview of robot steering control architecture. An eye-in-hand visual servo controller running at camera acquisition rates, 30 Hz, generates pressure set points for the three sPAMs. A lower-level pressure controller running at approximately 500 Hz maintains these desired pressures in the three sPAMs.

To control the pressure of the backbone as well as the heading of the continuum robot, pressure in the main tube and each of the three sPAMs is regulated. FIG. 3 provides a high-level block diagram of the steering control architecture, in which the pneumatic system operates to regulate pressure. Pressure set-points for the pneumatic backbone and three sPAMs could be regulated at 500 Hz by the pressure controller and commanded at 30 Hz by a visual servo controller. The pressure controller operates the pneumatic system, which has electronic proportional valves, that control air flow rates and analog pressure sensors from which pressure in the four chambers is measured for use in the pressure control loop.

Vision System

An eye-in-hand visual servo control law could be used to orient the robot toward a user-defined goal position. Visual features are observed using a 170 field-of-view miniature camera mounted at the tip of the continuum robot (FIGS. 1A-C) and measured by an image processing system at 30 Hz. The visual servo control law attempts to drive the location of a feature to a particular point in the camera's field of view (e.g. the image center). This enables a human operator to control the robot via a simple interface in which he or she selects a visual feature in the camera's field of view at which to point the growing robot. Allowing the robot to grow toward that feature will result in the robot reaching the specified destination.

Example 2

In a second example, we teach two principles that help enable a basic recreation of this growing behavior in an artificial system. First, an inverted, compliant, thin-walled vessel will lengthen from the tip by everting when pressurized. Second, the tip of the vessel steers along a path when the relative length of the side of the vessel on the outside of a turn is lengthened with respect to the length of the body along the inside of the turn. We present our implementation of this principle that uses controlled releasing of latches to lengthen the side of the body that is on the outside of the desired turn and show results of a soft robot lengthening toward a light, autonomously controlling direction with feedback from an onboard camera at the tip. Last, we show examples of the abilities of this type of robot body, demonstrating navigation through constrained environments and the formation of structures from the lengthening body.

Figure 4:
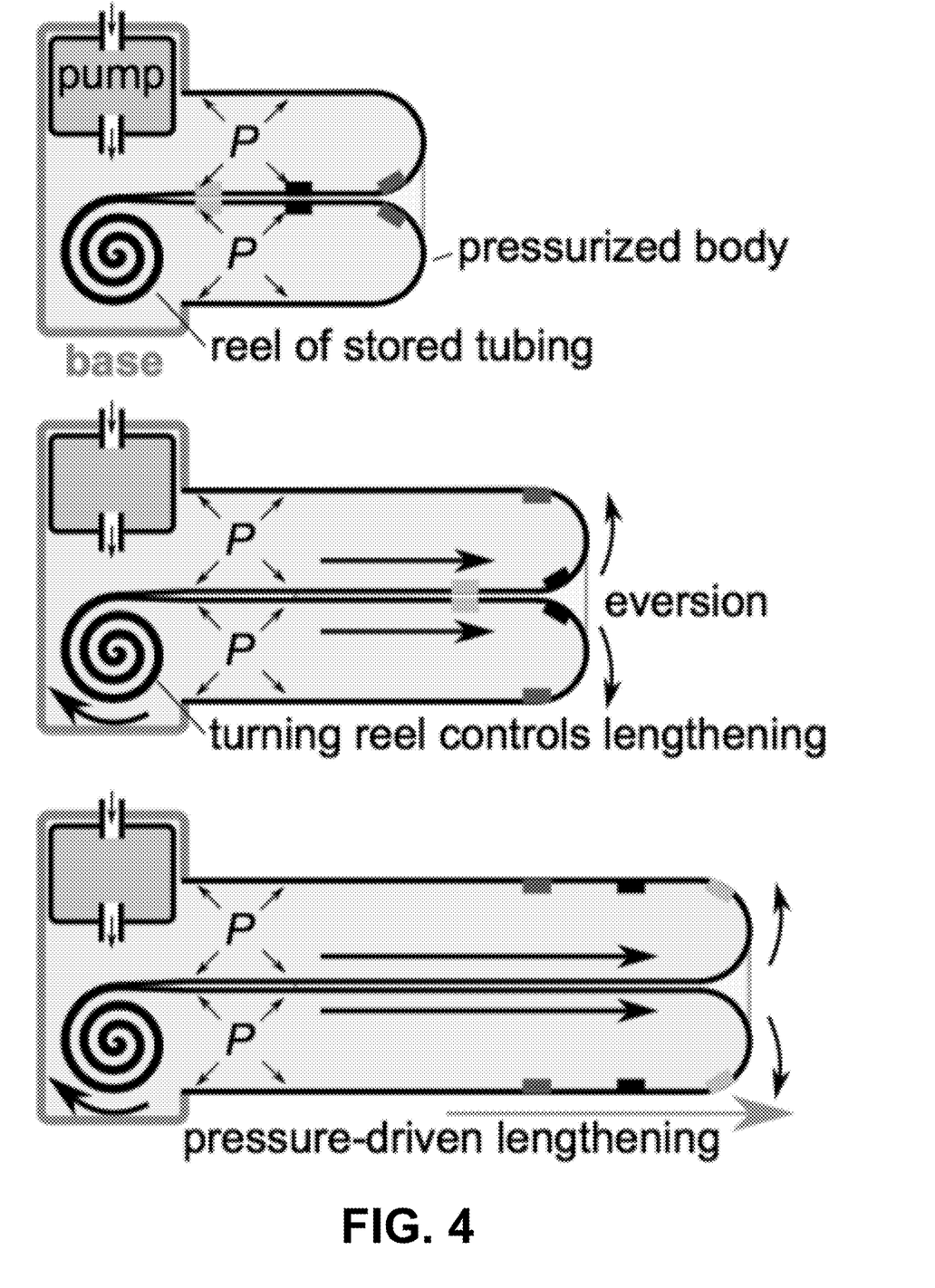
FIG. 4 shows according to an exemplary embodiment of the invention the principle of pressure-driven eversion enables lengthening from the tip at rates much higher than those found in plant cell growth. Implementation of principle in a soft robot. A pump pressurizes the body, which lengthens as the material everts at the tip. This material, which is compacted and stored on a reel in the base, passes through the core of the body to the tip; the rotation of the reel controls the length of the robot body.

The first principle, which is based on the eversion of a thin membrane driven by internal pressure, enables lengthening at the tip with substantial elongation and at a relatively high speed. The internal pressure forces the inverted material to evert at the tip while pulling more material from the base through the core of the body (FIG. 4). This principle is used to deploy invaginated appendages by a variety of invertebrates such as the *Sipunculus nudus*, which everts a proboscis for defense. An analog of this method of lengthening, continuous eversion as found in cytoplasmic streaming, is the inspiration for robotic whole-skin locomotion. In our system, we implemented the principle with a thin membrane of polyethylene driven by a pneumatic pump that pressurizes the interior of the soft robot body (FIG. 4). The design is scalable; wall stresses remain constant during geometric scaling of a thin-walled vessel, meaning that the ratio of wall thickness to diameter can be maintained. We have tested diameters ranging from 1.8 mm to 36 cm. The thin-walled, pressurized design enables not only lengthening at the tip but also substantial length change: Very little volume of precursor wall material results in a very large volume of pressurized body. Further, unlike lengthening invertebrates, we store the precursor material in a spool, allowing length change to be much greater than the 100% length change seen in these creatures. Although the number of turns that the soft robot body makes affects the maximum length, on paths with only a few turns, our system, initially 28 cm, has extended to a length of 72 m, limited by the amount of the plastic membrane on the spool.

Figure 5A:
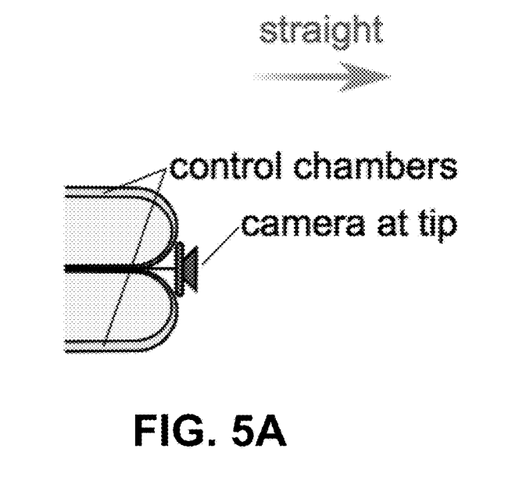
Figure 5B:
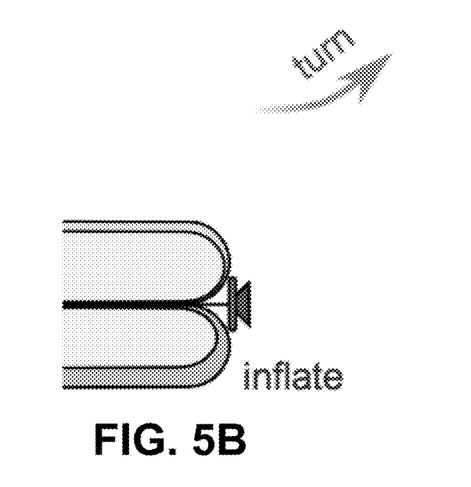
Figure 5C:
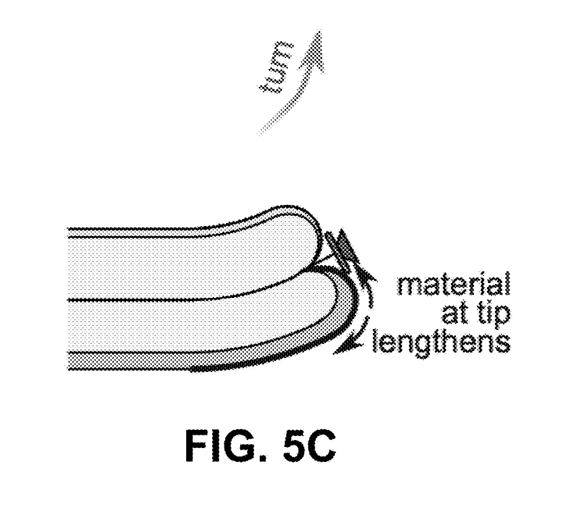
Figure 5D:
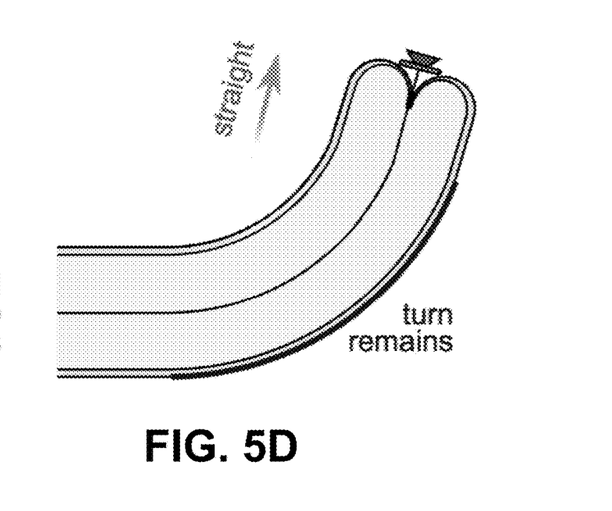

This principle of lengthening based on pressure-driven eversion also results in relatively fast lengthening, especially when compared to organisms that use growth to navigate their environments, such as certain fungi and plants. To understand the behavior of the rate of lengthening in our system, we measured the rate as we varied the internal pressure (FIG. 5C). Because of the energy losses caused by everting the membrane, we see a behavior characteristic of a Bingham plastic, in which there is a minimum required pressure before yield, and a monotonic relationship between the rate of lengthening and pressure. This is the same behavior observed in growing plant cells, which soften and then stretch because of internal pressure before new material is added to rethicken the walls. In plants, the relationship between rate and pressure is described using an inverse viscosity, termed "extensibility," $\varphi$. Our system has an extensibility that is seven orders of magnitude higher than in plants and only one order of magnitude higher than in invertebrates that use the same mechanism of lengthening (FIGS. 5C-D). Our peak bursting pressure is lower than that in a plant cell, resulting in a maximum rate of lengthening roughly five orders of magnitude higher than that in plant cells, with a maximum speed over short distances of 10 m/s.

Figure 6:
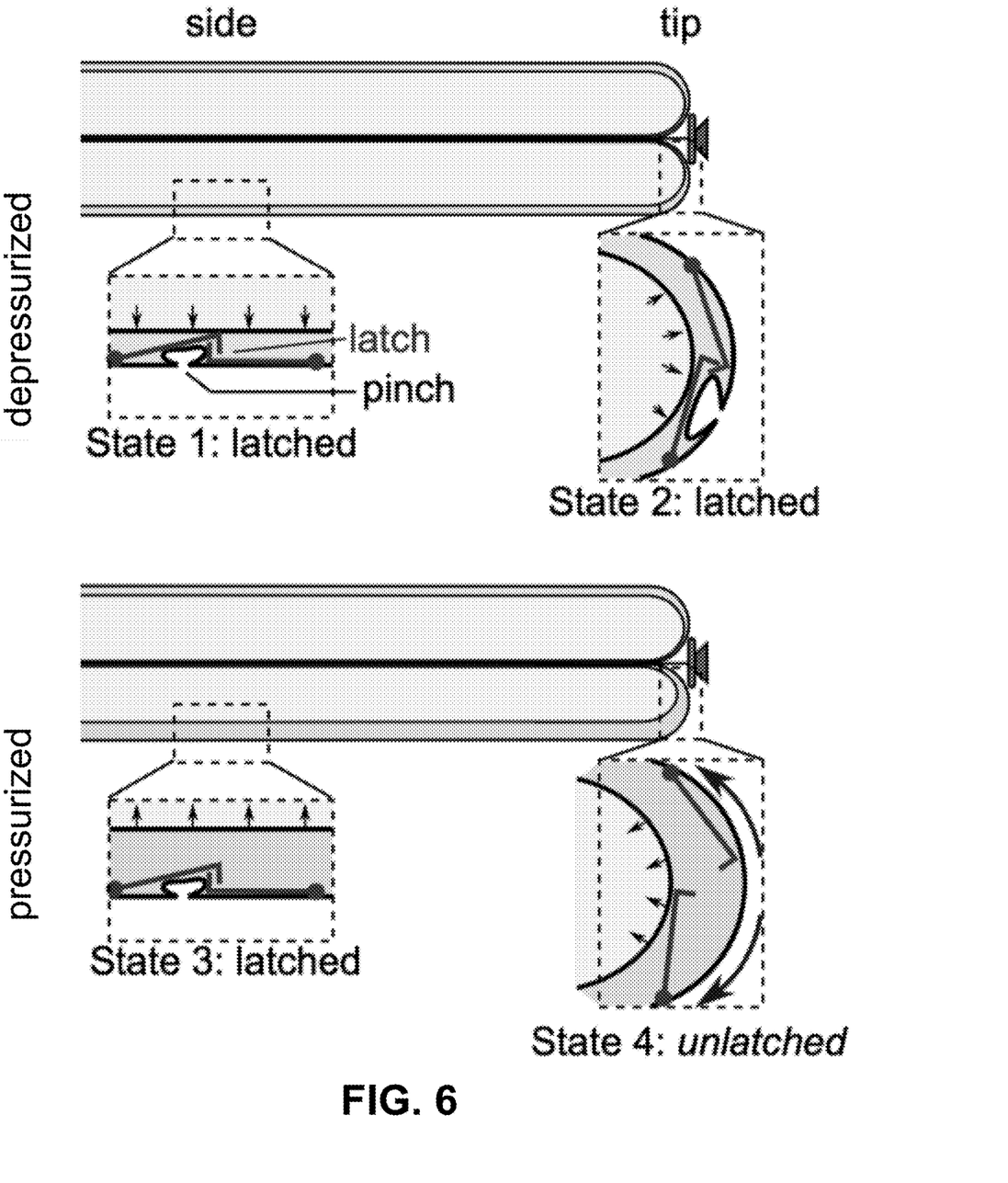

The second principle that we leverage in our design enables the active control of direction and is based on setting the relative lengths of either side of the body at the tip as the body grows in length. In our system, we selectively allowing one side of the robot body to lengthen with respect to the other side as the body everts from the tip (FIGS. 5A-D). Small control chambers that run along the side of the robot body act as the control input; when one of these chambers is inflated, the section of the robot body that is everting from the tip on that side will be lengthened. For example, when the left channel is inflated, the left side of the tip lengthens, resulting in a right turn (FIG. 6). Thus, by controlling the relative pressures of these control chambers, steering is achieved. This method of turning is efficient and simple; it requires neither the addition of energy (beyond the control signal) nor any bulky actuators to bend an existing segment. Rather the turn is created at the same time as the segment, using the energy stored in the pressurized fluid of the main chamber. Each turn is permanent, thus control of direction is nonholonomic, like in a steering car or growing pollen tube. Our implementation results in much faster changes in direction than the chemical diffusion of natural cells [less than a second for our system in contrast to roughly a minute for pollen tubes]. However, our implementation has closely packed discrete sections that can be lengthened (FIG. 6), resulting in a digital system, which sacrifices some resolution that an analog system affords. To demonstrate our implementation, a soft robot navigates to a light using an onboard tip-mounted camera with closed-loop active control.

In addition to demonstrating tip growth, substantial length increase, high-speed tip motion, and directional control, the presented class of soft robot shows some of the capabilities of natural cells and organisms that navigate by growth: movement through tightly constrained environments and the creation of 3D structures with the lengthening body. We tested our system by lengthening a soft robot body through challenging constrained environments and demonstrated its insensitivity to surface characteristics: It takes no more pressure to grow between two adhesive surfaces than between two polytetrafluoroethylene (PTFE) surfaces. Its ability to passively deform aids in its ability to move through constrained spaces and adapt to the environment. We also demonstrated 3D structures created by lengthening a preformed body: an active hook, a fire hose, and a radio antenna, as well as a structure that lengthens across land and water and another that pulls a cable through a dropped ceiling. A variety of purposes are demonstrated: the fire hose demonstrates delivery (like pollen tubes), the structure of the antenna demonstrates support (like sclerenchyma cells), and the cable-pulling structure demonstrates connecting remote locations (like neurons).

Construction

A lengthening soft robot comprises two main components: the extending body and the base (FIG. 4). Along the length of the extending body are control chambers that can be selectively inflated by the solenoid valves. There are chambers along two sides (for creating 2D shapes during lengthening) or three sides (for creating 3D shapes during extension). When a chamber is inflated during lengthening, the material at the tip of the inflated control chamber side lengthens. This creates a turn in the direction away from the inflated control chamber (FIGS. 5A-D).

Although a variety of implementations can realize this behavior, we describe the one used for the robot shown in FIG. 6. Within each control chamber is a continuous row of latches, with each latch roughly 2 cm long (body diameter is 3.8 cm). Each engaged latch crosses pinched wall material; in this way, the side lengthens when the latch is opened without requiring the material to stretch (FIG. 6). The opening of the latches is controlled by the pressure in its control chamber as well as the location of the latch. When a control chamber is not pressurized, the pressure from the main chamber keeps the latches closed. However, when the control chamber is pressurized, a latch can open, but only if it is at the tip of the robot body. When at the tip, the curvature causes the latch to release and the section to lengthen. In contrast, if the latch is on a straight section, it remains closed because of the interlocking of the latch. The latches are manufactured from a combination of sheet steel and polypropylene and attached to the outer wall using a soft viscoelastic adhesive. The latches can also be produced by 3D printing for large-batch fabrication. The latches can be reset after lengthening for a reusable system.

The change in the steering angle that a single closed latch will cause can be described by l divided by d, where l is the length removed by the pinch and d is the diameter of the robot body. This relationship is derived by assuming that the pinched and unpinched sides of the robot body lie on concentric circles, with the body diameter being the difference in the radius between the two curves.

The other component of the robot is the base. One implementation of the base is a cylindrical airtight acrylic vessel (28 cm long, 18 cm in diameter), containing a 6-V battery-powered air compressor that crosses the vessel boundary. Note that most testing was done with an off-board air supply. When turned on, the compressor increases the mass of the air inside the vessel, resulting in a force that tends to lengthen the robot body. A spool of thin-walled polyethylene tubing (50- to 80-mm wall thickness) supplies new material for lengthening, and a winching motor can control the rate and the direction that the spool turns. Electronically controlled solenoid valves selectively pressurize the control chambers of the robot body.

Active Steering Control with Onboard Sensing

Figure 7:
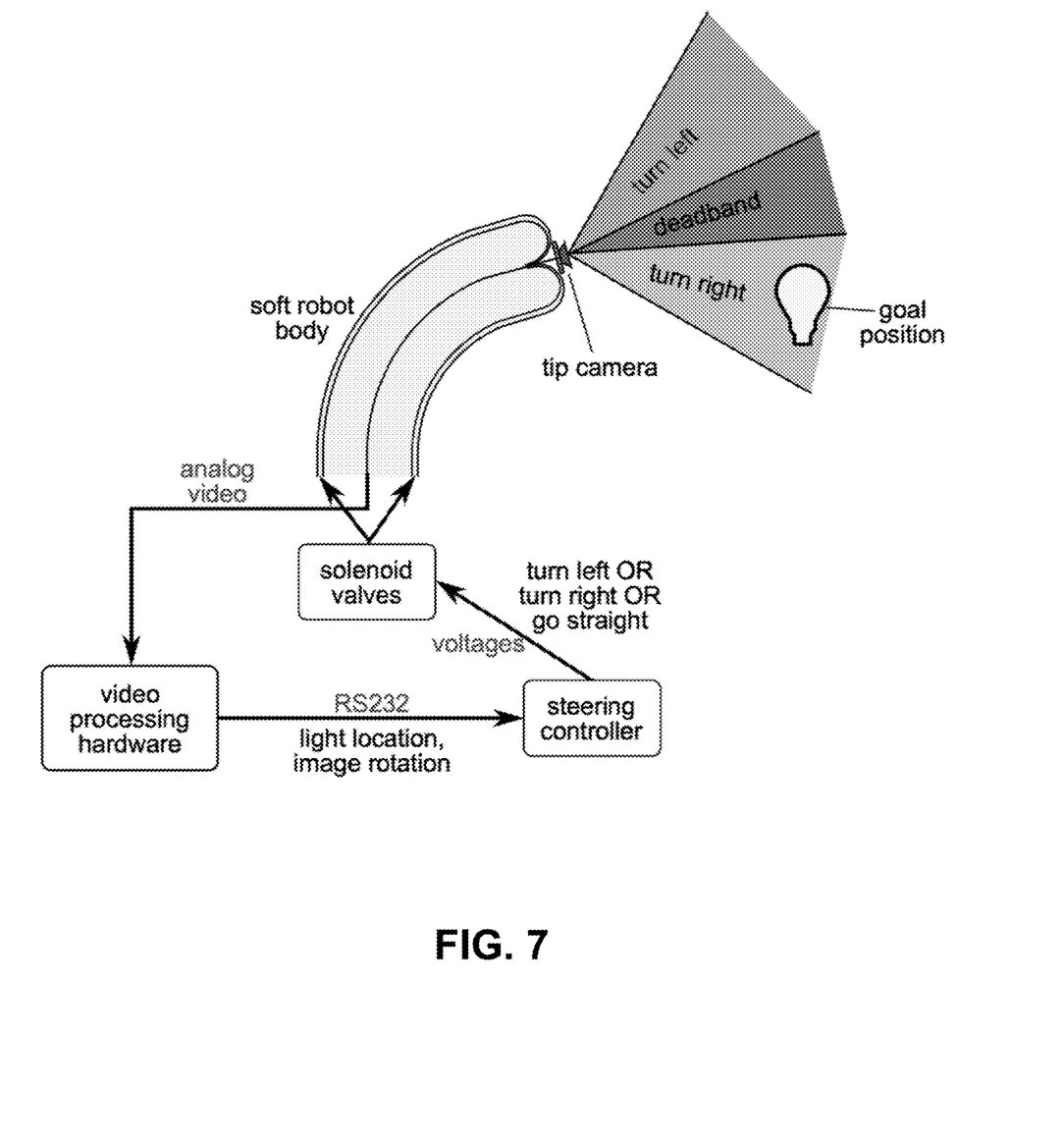
FIG. 7 shows according to an exemplary embodiment of the invention an overview of active steering control system. Hardware components and a physical depiction of the steering task are shown. Electrical signal formats are labeled in purple, and their semantic meanings are labeled in black.
Figure 8A:
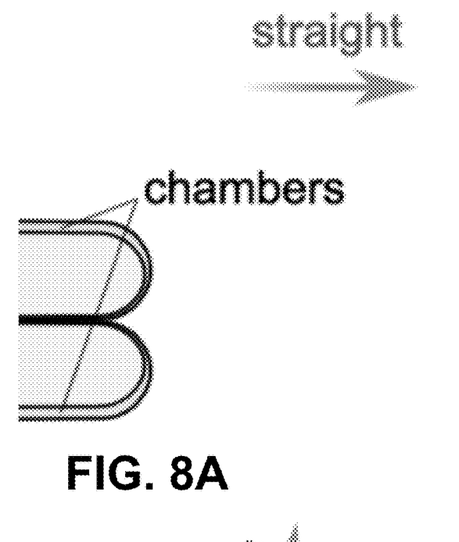
Figure 8B:
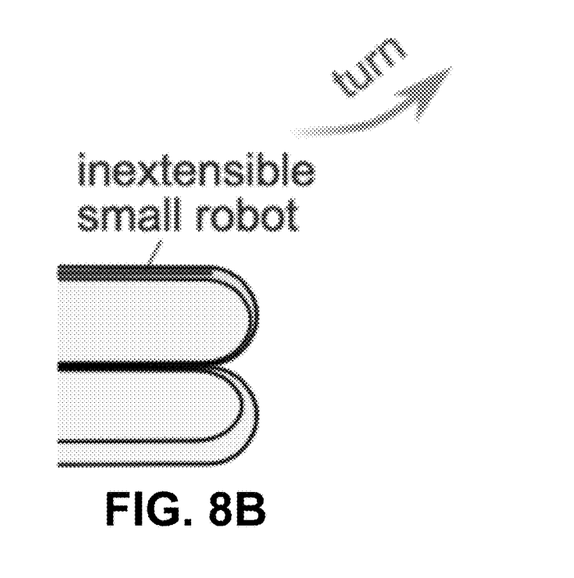
Figure 8C:
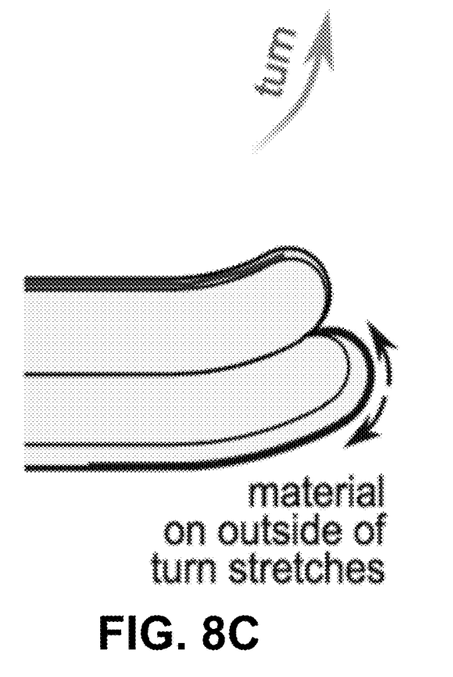
Figure 8D:
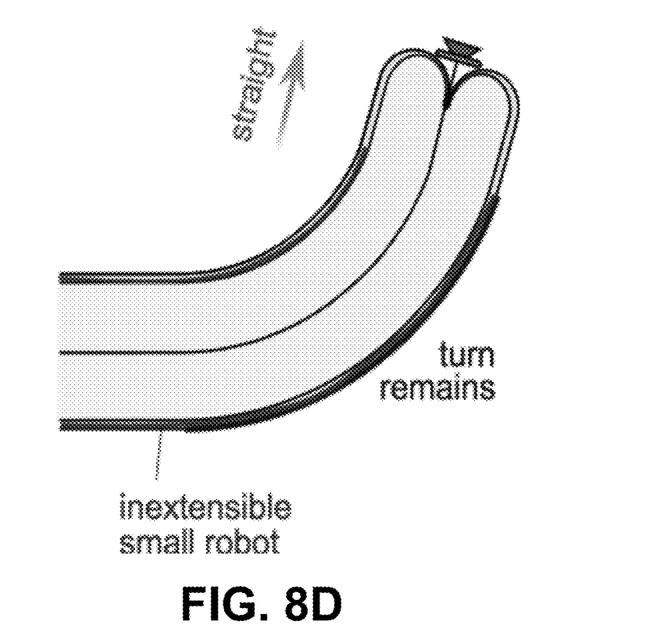

A task was created to demonstrate real-time steering control of the soft robot using onboard sensing. The objective of the task was to steer the tip of the soft robot in two dimensions to a goal location, indicated by an illuminated light bulb (FIG. 7).

Hardware Overview

The location of the illuminated light bulb was sensed using a miniature analog camera (640×480, 30 frames/s) at the tip of the soft robot. The camera's cables were routed along the inside of the robot's body, and the camera was kept at the tip by applying a constant tension force to its cables. This also served as a limit to the extension rate of the robot. Air was supplied to the main chamber of the soft robot with a pressure regulator. As described above and in FIGS. 5A-D, steering was implemented by inflating the control chambers of the robot: To turn right, the left chamber is inflated; to turn left, the right chamber is inflated; and to go straight, both side chambers (or neither chamber) are inflated. Electronic solenoids were used to selectively inflate the side chambers based on the commands of the vision-based steering controller.

Vision Processing

Data from the tip camera were processed using specialized video processing hardware. The video processing hardware computed both the location of the light and camera rotation about its optical axis. Light location was calculated using template-based object tracking, and camera rotation was calculated using image registration between the current and the last frame. Light location (in pixels) and camera rotation (in degrees) were communicated to the steering controller via RS-232.

Steering Controller

The soft robot was controlled to steer toward the light using a bang-bang heading controller that aligned the robot's tip heading with the ray emanating from the robot's tip to the light (FIG. 7). The light location, computed by the video processing hardware, was used to make decisions about when to turn left, turn right, or go straight. A 100-pixel dead-band was designated in the center of the tip camera frame. If the light location was more than 50 pixels to the left or right of the center of the tip camera image, then the steering controller commanded a left or right turn, respectively. Otherwise, the robot was commanded to go straight. Camera rotation relative to the robot body was estimated by integrating frame-to-frame rotation information. The estimated rotation was used to transform the location of the light into the robot coordinate frame so that a left-right steering decision could be made.

Example 3

In a third example, we teach a similar soft pneumatic continuum robot that grows in length from its tip, but with a different mechanism of steering. Here, the soft robot body is extensible in the axial direction (along the length of the body) (FIGS. 8A-D). It controls its direction of growth by actively constraining the side of its body along the inside of the turn, while the pressure in the body stretches the side of the body along the outside of the turn. In this manner, the robot is able to navigate to a designated goal position. One option for the mechanism for constraining the side of the body along the inside of the turn is a small, inextensible soft pneumatic robot that lengthens through a channel along the side of the main body. In sections where this small robot has extended, the main body cannot stretch. In sections where this small robot has not extended, the main body can stretch.

What is claimed is:

1. A robot navigating an environment through elongation, comprising: a thin-walled, hollow, compliant body that elongates the body by everting from its tip body material that is stored inside the body, wherein distributed over the length of the body, the body material comprises active mechanisms that evert from the tip along with the body material while elongating, wherein the active mechanisms that change length hence causing length changes of the body material of the body to thereby control directional changes at different aspect of the length of the body while the body is elongating or growing.

2. The robot as set forth in claim 1, wherein the active mechanisms are contracting artificial muscles mounted along the length of the body material.

3. The robot as set forth in claim 1, wherein the active mechanisms are actively releasing pinches in the body material.

4. The robot as set forth in claim 1, wherein the active mechanisms are actively restraining or relaxing mechanisms of the body material.

5. The robot as set forth in claim 1, wherein the thin-walled, hollow, compliant body is pressurized.

* * * * *